June 6, 1933.   H. A. COOK   1,913,192
ADJUSTABLE INSERT
Filed July 27, 1931

Inventor:
Henry A. Cook,
by Charles E. Tullar.
His Attorney.

Patented June 6, 1933

1,913,192

UNITED STATES PATENT OFFICE

HENRY A. COOK, OF TRUMBULL, CONNECTICUT, ASSIGNOR TO GENERAL ELECTRIC COMPANY, A CORPORATION OF NEW YORK

ADJUSTABLE INSERT

Application filed July 27, 1931. Serial No. 553,381.

My invention relates to an adjustable insert, and more particularly to such an insert for use in an underfloor duct wiring system. The underfloor duct system of wiring has come into extensive use because of the flexibility it provides in the ease of changing the position of electrical outlets. The openings may be made in the duct at any time that it is desired to have a wiring outlet at a particular point. In order to provide a passage communicating with the duct an insert is used. This insert is threaded to receive a floor flange in which the wiring outlet is threaded. To make the opening in the floor neat in appearance it is desirable to have an insert which is adjustable so it may be made flush with the floor surface.

It is an object of my invention to provide an improved insert with a considerable range of adjustability.

What I believe to be novel and my invention will be better understood from the following detailed description when taken in connection with the accompanying drawing and the scope thereof will be pointed out in the appended claims.

Figure 1:
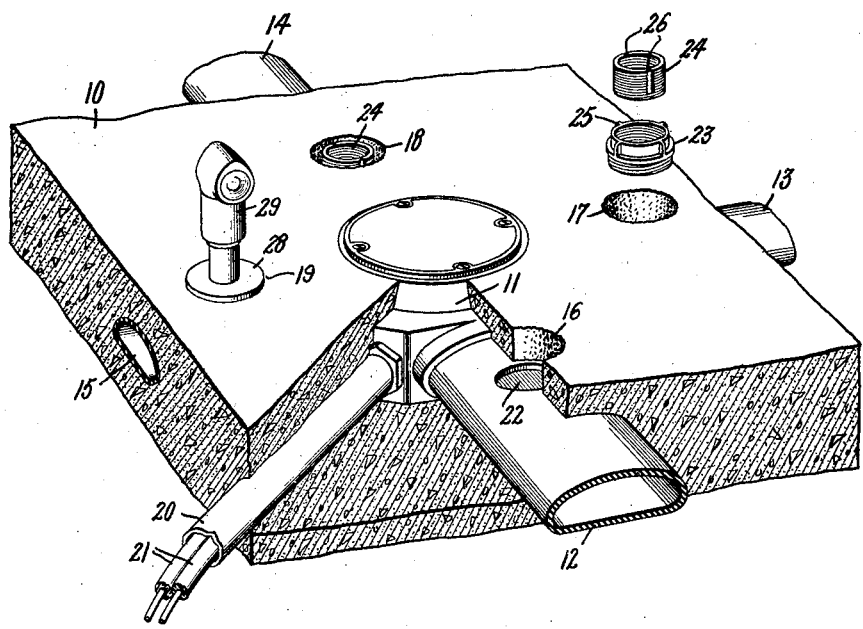
Figure 2:
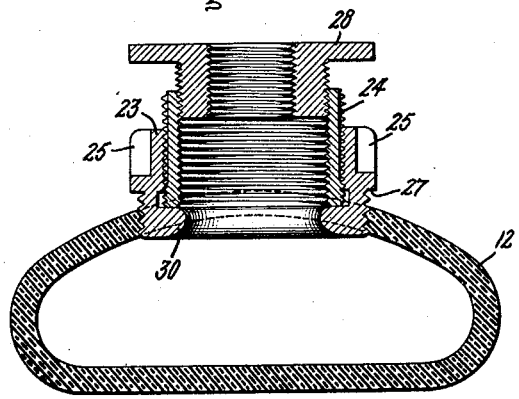

Fig. 1 is a section of a concrete floor shown in perspective with a portion of the floor broken away to expose the duct and outlet box embedded in the floor; Fig. 2 is a cross-sectional view of the duct and insert located in position in the duct.

10 indicates a section of the concrete floor with an outlet box 11 embedded in its center. Four fiber ducts 12, 13, 14 and 15 are shown connected to the outlet box 11 90° apart. Four openings 16, 17, 18 and 19 are shown indicating four different steps in the process of providing a wiring outlet connecting with the underfloor duct. In practice these openings would not be equally spaced from the outlet box 11 but might be located at any points along the ducts. A conduit 20 with conductors 21 located therein is connected to the outlet box 11 at an angle to the adjacent ducts 12 and 15. These conductors 21 are connected to the electrical supply circuit and thus make it possible to make connections from the outlet box 11 to the supply circuit.

In the process of installing an underfloor duct system the outlet boxes and ducts are first placed in position with the ducts communicating between adjacent outlet boxes. The ducts may be laid in parallel lines in the form of a grid or they may be located near the walls of the room. After the outlet boxes and ducts have been placed in position conduits are connected to the outlet boxes and wires brought through the conduit to connect the outlet box to the electrical supply circuit. The floor is then laid over the ducts with the top of the outlet box flush with the surface of the floor. Subsequently when a wiring outlet is required, adjacent outlet boxes are located and a line drawn between them which indicates the position of the duct. A point is then selected along this line which is nearest to the desired location for the wiring outlet. A hole is made in the floor at this point, as indicated at 16. A smaller opening is made in the duct, as shown at 22 in duct 12. An insert is then threaded into the opening 22 in the duct. The insert of my invention is a two part insert with a base 23 and a sleeve 24. The base 23 is threaded into the opening 22 in the duct and the sleeve 24 threaded into the base 23 so that the top of the sleeve is flush with the surface of the floor, as indicated at 18. The base 23 of the insert is provided with radial projections 25 which serve to prevent the rotation of the base member after concrete is put in the opening in the floor around the insert. Slots 26 are provided in the sleeve on opposite sides so that a tool may be used to thread the sleeve into the base member and to adjust its height. Base member 23 of the insert is provided with a shoulder 27 which serves as a stop to limit the distance the base member may be threaded into the duct 12. The shoulder 27 engages the top of the arch of the duct 12, as shown in dotted lines in Fig. 2. This stop is important because otherwise the insert may be threaded so far into the duct as to limit the space within the duct for the storage of wire and thus interfere with the passing of the wires through the duct. Also, this shoulder when firmly seated in the duct clamps a portion of the duct, when a fiber duct is used, between the threads and the shoulder and acts as a friction means to prevent the base from backing out when the sleeve 24 is subsequently unscrewed. After the insert base 23 and sleeve 24 have been located in position the floor opening around the insert is filled in. A floor flange 28 is threaded into the insert sleeve 24. A wire is then passed from the nearest outlet box 11 through the duct to the opening provided therein. If it is desired to provide an electrical connection to the supply circuit then the wires are connected to the conductors 21 in the outlet box 11. If a telephone outlet is desired then wires may be passed through a duct from the telephone switchboard to outlet box 11 and the wires brought out through the insert may be connected in outlet box 11 to the telephone switchboard. The wires brought out through the insert may be connected to a wiring device supported in a stand-pipe 29 which is threaded into the floor flange or the stand-pipe 29 may merely have openings through which telephone wires may pass as shown in Fig. 1. If linoleum were laid on the floor, floor flange 28 would be flat and about the thickness of the linoleum. If the floor is to remain bare then it would be desirable to use a floor flange with a bevelled edge so that dirt would not readily collect around the edge of the flange.

In Fig. 2 the insert 23 and sleeve 24 are shown in the duct 12 with floor flange 28 threaded into the sleeve 24. It may be readily seen in this figure that if the shoulder 27 were not provided on the base member 23, it would be quite likely that the base member would be threaded so far into the duct 12 that it would seriously interfere with the operation of passing the wires through the duct and pulling them out through the opening provided by the insert. The base member 23 is also provided with an inwardly extending shoulder 30 to limit the distance that the sleeve 24 maybe threaded into the base member and also to prevent the sleeve 24 from being threaded so far into the base as to extend within the duct 12. Shoulder 30 is curved so that it will not present any sharp edges to conductors which would be likely to injure the insulation on the conductors as they pass through the insert. Sleeve 24 is shown engaging the shoulder 30, which is the lowest position it may assume. To adjust the sleeve 24 flush with the surface of the floor it may be threaded out of engagement with the shoulder 30. The extent of the adjustability of the sleeve 24 is determined by the distance between the shoulder 30 and the top of the base member 23. The height above the base member 23 to which the sleeve 24 may be adjusted is determined by the length of the sleeve 24. Therefore, if it were desirable to adjust the sleeve to a greater height than is possible with a particular insert for use in floors of unusual depth, it is merely necessary to provide a sleeve 24 of greater length.

What I claim as new and desire to secure by Letters Patent of the United States is:—

1. An adjustable insert for a duct located in a floor comprising a base with external threads and a shoulder to limit the distance the base may be inserted in a duct, said base having internal threads, an extension sleeve adapted to be threaded in said base, and a floor flange adapted to be threaded into said extension sleeve.

2. An adjustable insert for a duct located in a floor comprising a base with external threads and having a shoulder to limit the distance the base may be inserted in a duct, said base having internal threads and an inwardly extending shoulder curved to present a smooth surface to a conductor passing through the insert, an extension sleeve with threads inside and out adapted to be threaded in said base, and a floor flange adapted to be threaded into said extension sleeve.

3. In combination, a fiber duct having an arched top and adapted to be located in a floor, an insert base with external threads and a shoulder adapted to clamp a portion of the duct when threaded into an opening in the duct, an extension sleeve having internal and external threads and adapted to be threaded in said base, and a floor flange adapted to be threaded into said extension sleeve.

In witness whereof, I have hereunto set my hand.

HENRY A. COOK.